(12) United States Patent
Nakamura et al.

(10) Patent No.: US 10,816,338 B2  
(45) Date of Patent: Oct. 27, 2020

(54) SURVEYING DEVICE

(71) Applicant: TOPCON CORPORATION, Itabashi-ku, Tokyo (JP)

(72) Inventors: Satoshi Nakamura, Kanagawa (JP); Junya Touno, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 240 days.

(21) Appl. No.: 15/779,659

(22) PCT Filed: Nov. 28, 2016

(86) PCT No.: PCT/JP2016/085221  
§ 371 (c)(1),  
(2) Date: May 29, 2018

(87) PCT Pub. No.: WO2017/094679  
PCT Pub. Date: Jun. 8, 2017

(65) Prior Publication Data  
US 2018/0259331 A1 Sep. 13, 2018

(30) Foreign Application Priority Data  
Nov. 30, 2015 (JP) .................. 2015-232973

(51) Int. Cl.  
*G01C 15/00* (2006.01)  
*G01B 11/26* (2006.01)

(52) U.S. Cl.  
CPC ............ *G01C 15/004* (2013.01); *G01B 11/26* (2013.01); *G01C 15/00* (2013.01); *G01C 15/002* (2013.01)

(58) Field of Classification Search  
CPC .................................................. G01C 15/004  
(Continued)

(56) References Cited

U.S. PATENT DOCUMENTS

| 5,835,069 A | 11/1998 | Skoog |
| 5,949,548 A | 9/1999 | Shirai et al. |

(Continued)

FOREIGN PATENT DOCUMENTS

| DE | 19802379 A1 | 7/1998 |
| EP | 1061335 A2 | 12/2000 |

(Continued)

OTHER PUBLICATIONS

Extended Search Report dated Jun. 24, 2019, in connection with European Patent Application No. 16870616.6, 6 pgs.

(Continued)

*Primary Examiner* — Christopher W Fulton  
(74) *Attorney, Agent, or Firm* — Chiesa Shahinian & Giantomasi PC

(57) ABSTRACT

To provide a surveying device whereby there is no need to remove a light-receiving part when removing a handle. A surveying device is provided with a handle having a cantilever structure provided with a rod-shaped grip part and a handgrip support part for supporting one end of the grip part, and a body having a top-part structure having a two-headed structure configured from a body part and a body part extending upward, a light-receiving part for optical communication is provided, a handgrip support part in which the rod-shaped grip part is fixed in a detachable state is fixed to a top part of the body part, and the handgrip support part is fixed in a detachable state to a top part of the body part.

6 Claims, 5 Drawing Sheets

(58) Field of Classification Search
USPC .......................................... 33/227, 290, 292
See application file for complete search history.

(56) References Cited

U.S. PATENT DOCUMENTS

| | | | | |
|---|---|---|---|---|
| 5,992,031 | A * | 11/1999 | Shirai | H05K 5/023 16/114.1 |
| 6,138,367 | A * | 10/2000 | Raby | G01C 1/02 33/1 CC |
| 6,354,010 | B1 * | 3/2002 | Shirai | G01C 1/02 33/284 |
| 7,669,340 | B2 * | 3/2010 | Matsuo | G01C 1/04 33/290 |
| 7,726,033 | B2 * | 6/2010 | Ohtomo | G01C 15/002 33/275 R |
| 7,793,424 | B2 * | 9/2010 | Laabs | G01C 15/002 33/290 |
| 8,881,412 | B2 * | 11/2014 | Nishita | G01C 15/008 33/290 |
| 2008/0094606 | A1 | 4/2008 | Schwarz | |
| 2008/0120855 | A1 * | 5/2008 | Matsuo | G01C 1/04 33/290 |
| 2009/0024342 | A1 * | 1/2009 | Hertzman | G01C 15/00 702/94 |
| 2010/0088910 | A1 * | 4/2010 | Svanholm | G01C 1/04 33/290 |
| 2010/0271637 | A1 * | 10/2010 | Li | G01C 1/02 356/614 |
| 2015/0098075 | A1 * | 4/2015 | Bestler | G01S 7/51 356/3.01 |
| 2017/0307370 | A1 * | 10/2017 | Tanaka | G01S 17/89 |

FOREIGN PATENT DOCUMENTS

| | | |
|---|---|---|
| EP | 1686350 A1 | 8/2006 |
| JP | S61-202011 | 8/1986 |
| JP | H0783658 A | 3/1995 |
| JP | H10-293029 A1 | 11/1998 |
| JP | 2000-356518 A | 12/2000 |
| JP | 2005-227165 A | 8/2005 |
| JP | 2008-528989 A | 7/2008 |
| JP | 4242790 B2 | 3/2009 |

OTHER PUBLICATIONS

International Search Report dated Feb. 14, 2017, in connection with International Patent Application No. PCT/JP2016/085221, 6 pgs.

* cited by examiner

SURVEYING DEVICE

CROSS-REFERENCE TO RELATED APPLICATIONS

This application is a national stage (under 35 U.S.C. 371) of International Patent Application No. PCT/JP2016/085221, filed Nov. 28, 2016, claiming priority to Japanese Patent Application No. 2015-232973, filed Nov. 30, 2015, both of which are herein incorporated by reference in their entirety.

FIELD

The present invention relates to a surveying device.

BACKGROUND

A total station is one type of publicly known surveying devices that use laser light. A total station has a carrying handle attached at its upper part. The total station may be used in surveying in the zenith direction, and in such situations, the handle may interfere with the surveying. In anticipation of such situations, the handle is made so as to be removable (see, e.g., Japanese Patent No. 4242790; hereinafter JP Patent '790).

The structure disclosed in JP Patent '790 has a handle of which only a hand-grip part is made removable. The removal and the attachment of the handle require use of a tool. Working using the tool is troublesome at surveying sites, and therefore, a structure allowing a handle to be attached and detached by an easier method is desired.

A total station has a function for optically communicating with a reflective prism. The reflective prism is a target for locating and may be held by a hand of an operator. Using this function enables autonomous search in the direction of the reflective prism as seen from the total station. This function is obtained by providing a light receiving part for receiving a light signal, to the total station. The light receiving part needs to be mounted at an upper part of the total station to obtain a sufficient light receiving range. In addition, the light receiving part requires a peripheral circuit of an electronic circuit that converts a light signal into an electric signal. A connection wire is drawn from the electronic circuit to connect the electronic circuit and a controller inside a main body of the total station.

In a conventional structure, a handle that is removable relative to the main body is configured of a hand-grip part and a holder for holding the hand-grip part from both sides. The light receiving part for optical communication and the electronic circuit relating to the light receiving part are arranged at the holder.

In this structure, to make the handle removable from the main body, a connector for connecting the connection wire is arranged at each of the handle side and the main body side. This structure tends to fail in contact with the connector because connection and disconnection of the connector are repeated by repeated attachment and detachment of the handle. In particular, the attachment and the detachment of the handle are normally performed outdoors, and failure in contact easily occurs.

In view of these circumstances, an object of the present invention is to provide a surveying device having a carrying handle and an optical communication function while satisfying the following requirements.

(1) The carrying handle is removable by a simple operation.
(2) A light receiving part for optical communication is arranged at the highest possible position in an upper part.
(3) The handle is removable without the need to remove the light receiving part.

SUMMARY OF THE EMBODIMENTS

A first aspect of the present invention provides a surveying device characterized by including a handle with a cantilever structure having a rod-like grip and a first support that supports an end of the grip and including a main body with an upper part structure of a double headed structure having a first part and a second part that extend upwardly. A second support has a light receiving part for optical communication and has the rod-like grip that is attachably and detachably secured. The second support is secured to an upper part of the second part. The first support is attachably and detachably secured to an upper part of the first part.

A second aspect of the present invention in the first aspect of the present invention may be characterized in that the second support is attachably and detachably secured to the second part.

A third aspect of the present invention in the first or the second aspect of the present invention may be characterized in that: the first support includes a first button that moves an engaging member engaging with the first part, and the second support includes a second button that moves an engaging member engaging with the rod-like grip.

A fourth aspect of the present invention in any one of the first to the third aspects of the present invention may be characterized in that: the first support and the second support are secured at the same height position, and the rod-like grip is horizontal.

According to the present invention, a surveying device having a carrying handle and an optical communication function while satisfying the following requirements is obtained.
(1) The carrying handle is removable by a simple operation.
(2) A light receiving part for optical communication is arranged at the highest possible position in an upper part.
(3) The handle is removable without the need to remove the light receiving part.

DETAILED DESCRIPTION OF THE EMBODIMENTS

Figure 1:
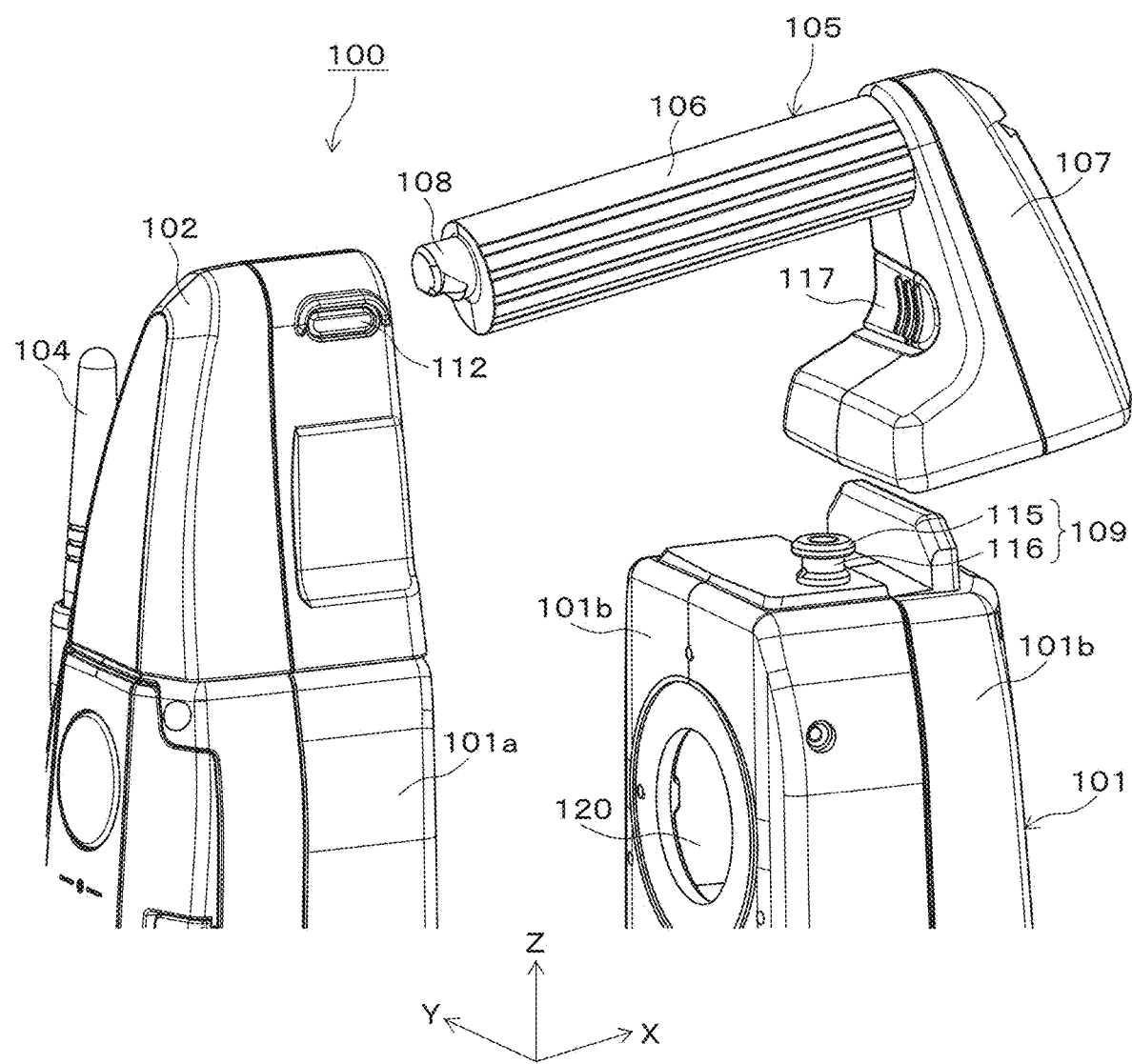
FIG. 1 is a perspective view of an embodiment.
Figure 6:
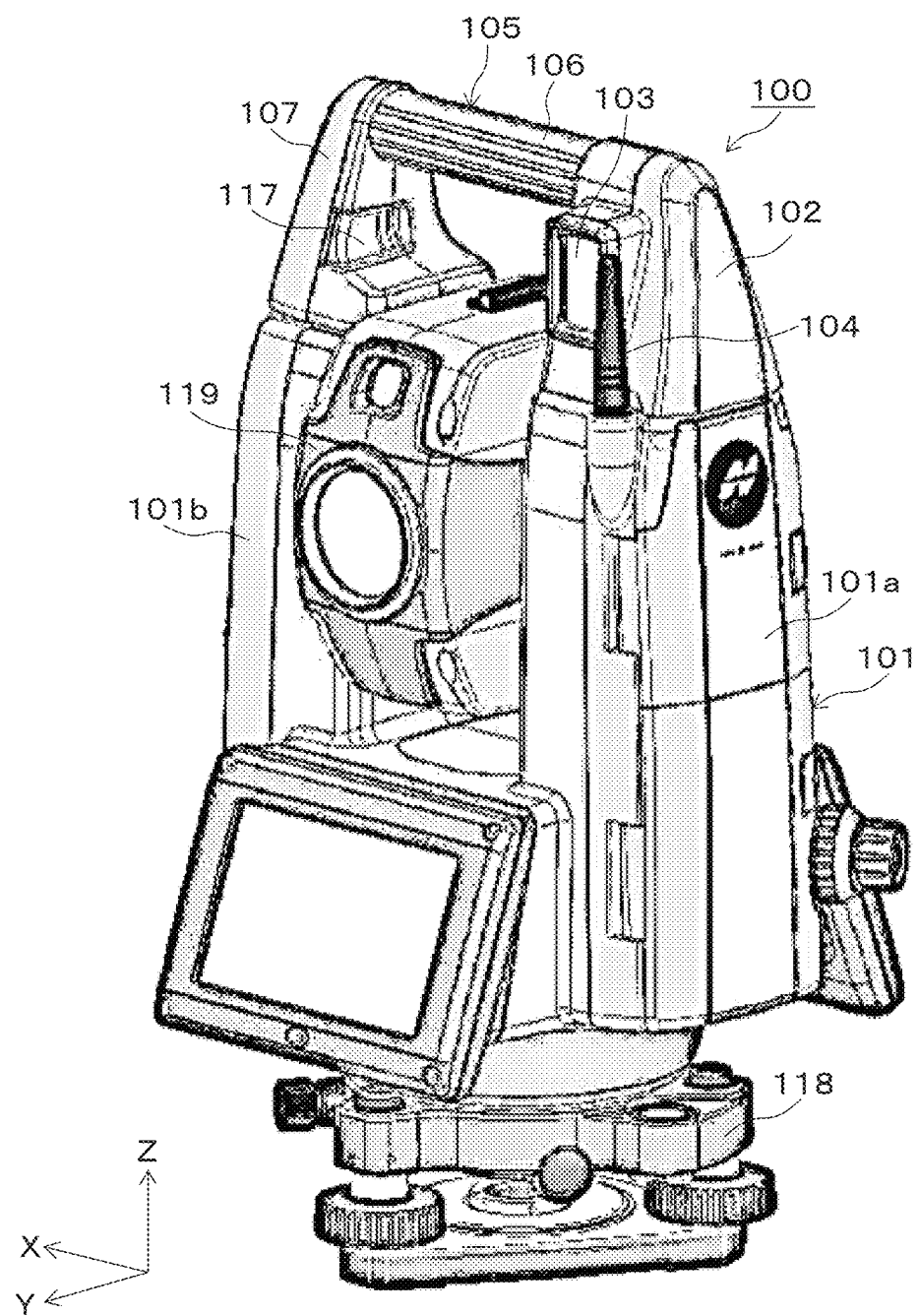
FIG. 6 is a perspective view of the embodiment.

FIGS. 1 and 6 illustrate a surveying device 100. The surveying device 100 is a total station and has a function of measuring a distance using laser light and a function of locating. The functions of the surveying device 100 are the same as those of an ordinary total station. The surveying device 100 has a main body 101. The main body 101 is mounted on a base 118, in a horizontally turnable condition.

The base 118 is supported by a tripod or other structure. The main body 101 has a double headed structure with two main body parts 101a and 101b that extend upwardly. The main body parts 101a and 101b have a movable optical part 119 (which is removed in FIG. 1) attached there between in a movable condition in an elevation angle direction and a depression angle direction. The movable optical part 119 includes a laser light emitting unit, a light receiving part, and an optical lens. The reference sign 120 in FIG. 1 indicates a hole for holding the movable optical part 119 in FIG. 6 in a rotatable condition.

The main body part 101a has a handle support 102 that is attachably and detachably attached on an upper part of the main body part 101a. The handle support 102 is secured to the main body part 101a by a fastening member (screw), which is not illustrated in the drawings. The reference sign 104 indicates an antenna for wirelessly communicating with a target or a tablet.

Figure 2:
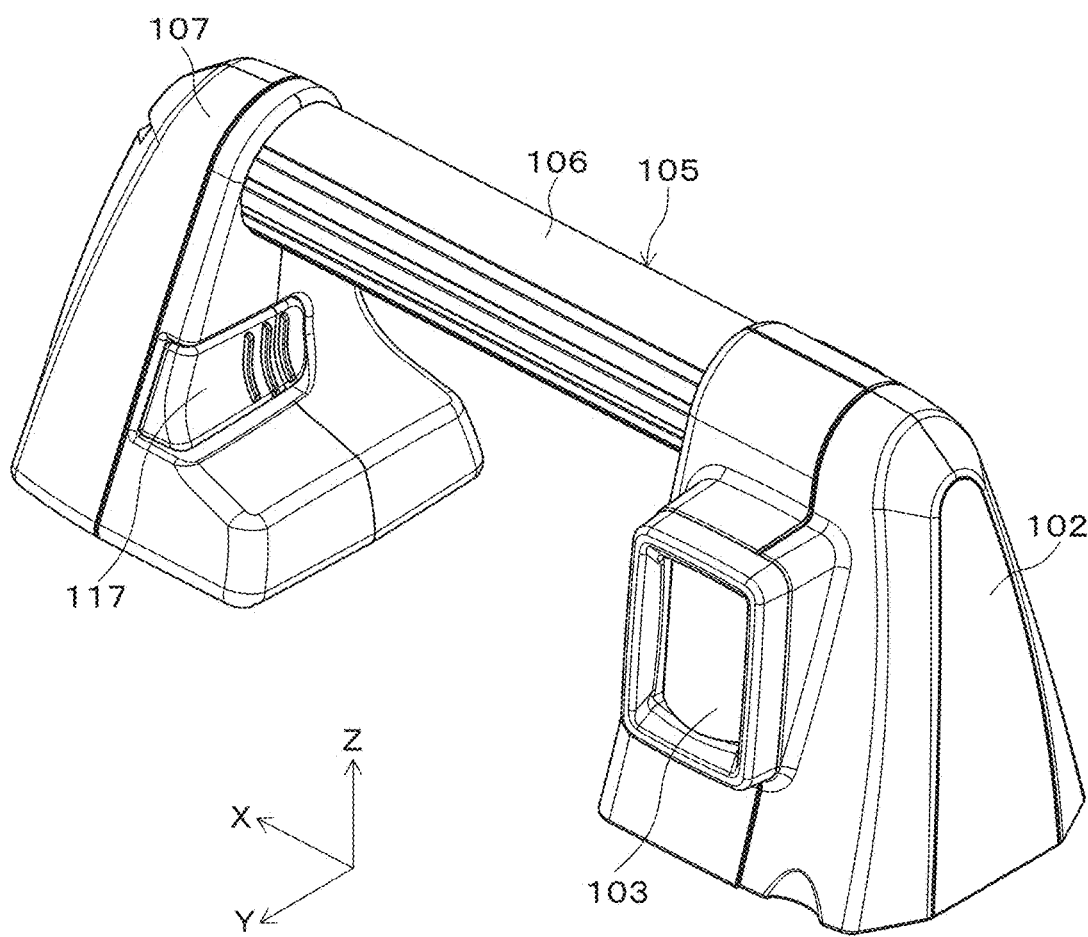
FIG. 2 is a perspective view of a handle in the condition of being attached to a main body as seen from the reerse side of the view shown in FIG. 1.

A light receiving part 103 (refer to FIGS. 2 and 6) for optical communication is arranged to the handle support 102. The handle support 102 houses a peripheral circuit of the light receiving part 103. A handle-support-side electrode is arranged at a contact part of the handle support 102 to the main body part 101a. The handle-support-side electrode is connected with a signal cable and a power cable that are connected to the peripheral circuit. A main-body-side electrode is arranged to the main body part 101a. The main-body-side electrode contacts with the handle-support-side electrode. This structure enables the handle support 102 and the main body 101 to be electrically connected to each other when the handle support 102 is attached to the main body part 101a.

Figure 3:
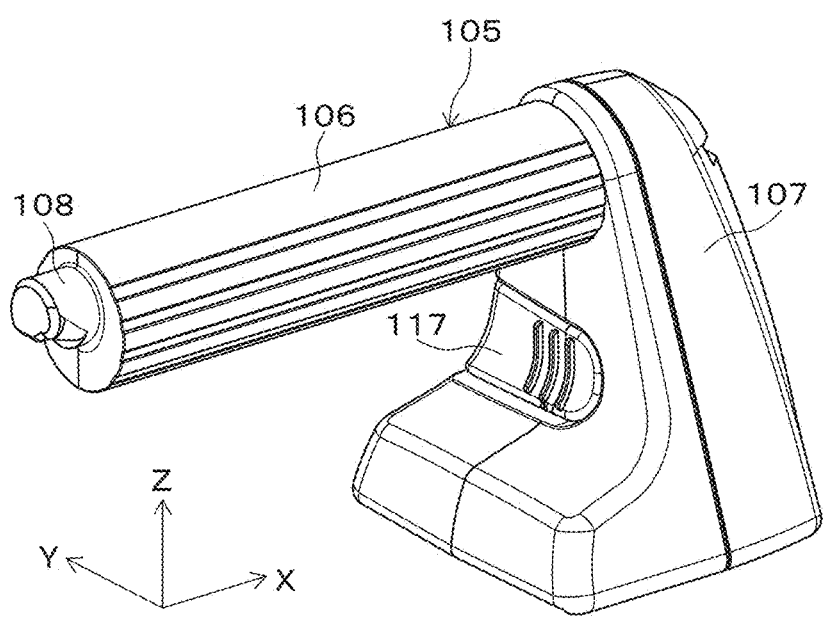
FIG. 3 is a perspective view of the handle in the condition of being removed from the main body.

The main body 101 has a handle 105 that is attachably and detachably attached at an upper part of the main body 101. The handle 105 is used for carrying the surveying device 100 or other purposes. The handle 105 has a cantilever structure having an approximately cylindrical grip 106 and a handle support 107 that are integrated. The handle support 107 is paired with the handle support 102 (refer to FIG. 2). The handle 105 is attachable and detachable to the main body 101 by a simple operation using a button, instead of using a tool such as a driver. FIG. 3 is a perspective view of the handle 105 in the condition of being removed from the main body 101.

The handle 105 is attached to the main body 101 and is secured by engaging a part of an end 108 of the grip 106 with an inside of the handle support 102 and by engaging a bottom of the handle support 107 with an engaging part 109 at an upper part of the main body part 101b. It is clear from the structure illustrated in FIG. 1 that, to attach the handle 105 to the main body 101, the handle support 102 must be attached to the main body 101.

Figure 4A:
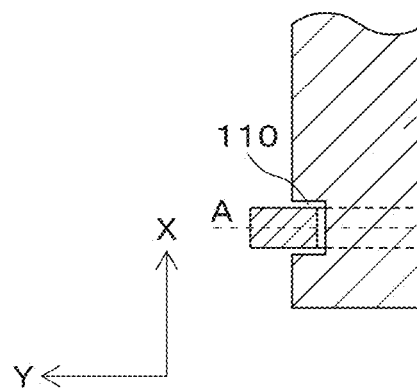
FIGS. 4A to 4D are conceptual diagrams for illustrating a principle of an engaging structure.
Figure 4C:
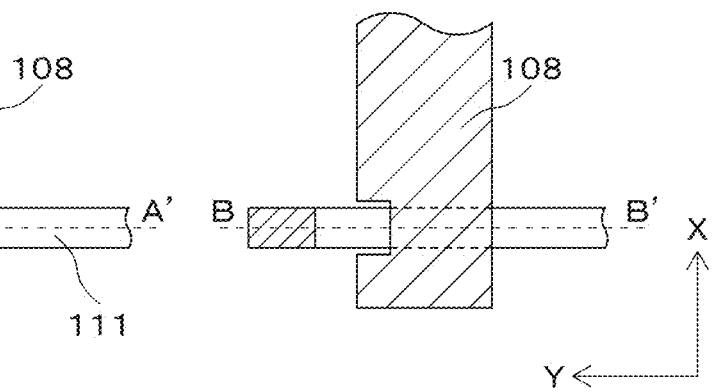
Figure 4B:
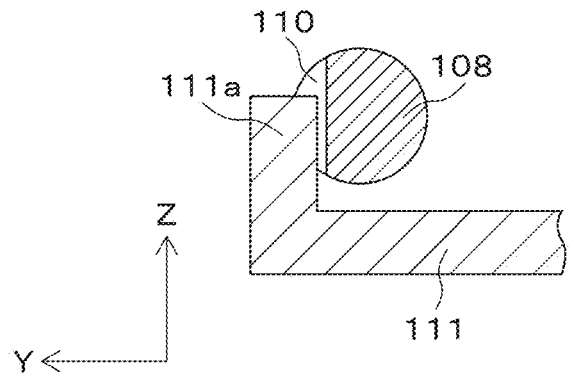
Figure 4D:
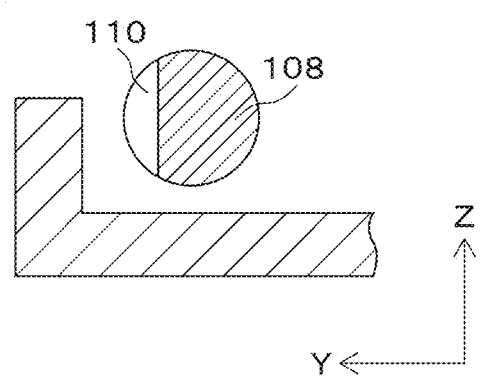

The following describes a principle of the engagement of the end 108 of the columnar (rod-like) grip 106 to the handle support 102. FIGS. 4A to 4D are conceptual diagrams for illustrating the principle of the engagement of the end 108 to the handle support 102. In FIGS. 4A to 4D, a cross section cut along the A-A' line in FIG. 4A is illustrated in FIG. 4B, and a cross section cut along the B-B' line in FIG. 4C is illustrated in FIG. 4D.

An engaging member 111 that is slidable in a Y-axis direction is arranged inside the handle support 102. The engaging member 111 moves in a Y-axis positive direction when a button 112 provided to the handle support 102 is pushed. The engaging member 111 is urged in a Y-axis negative direction by an urging means such as a spring. The engaging member 111 is in the state illustrated in FIGS. 4A and 4B when the button 112 is not pushed, whereas the engaging member 111 is in the state illustrated in FIGS. 4C and 4D when the button 112 is pushed. When the button 112 is released from the condition in which the button 112 is pushed, the biasing means makes the engaging member 111 move in the Y-axis negative direction and change the state illustrated in FIGS. 4C and 4D into the state illustrated in FIGS. 4A and 4B.

First, a case of attaching the handle 105 to the handle support 102 is described. In this case, while the button 112 is pushed, the end 108 is pushed into the handle support 102. Thus, the state illustrated in FIGS. 4C and 4D is obtained. Under this condition, when the button 112 is released, the biasing means makes the engaging member 111 move in the Y-axis negative direction and thereby come into the state illustrated in FIGS. 4A and 4B. In this condition, an L-shaped hooking part 111a hooks at a groove 110 of the end 108, and thus, the end 108 (handle 105) cannot move in an X-axis positive direction. That is, the handle 105 cannot be removed from the handle support 102.

Next, a case of removing the handle 105 from the handle support 102 is described. In a condition in which the handle 105 is attached to the handle support 102, that is, in the state illustrated in FIGS. 4A and 4B, when the button 112 is pushed, the engaging member 111 moves in the Y-axis positive direction and comes into the state illustrated in FIGS. 4C and 4D, whereby the engaging condition of the hooking part 111a with the groove 110 of the end 108 is released. In this condition, the end 108 (handle 105) is moved in the X-axis positive direction, that is, the handle 105 is pulled out from the handle support 102.

Next, a principle of engagement of the handle support 107 with the main body part 101b is described. The handle support 107 is attachably and detachably secured to the main body part 101b by using the engaging part 109 (refer to FIG. 1), as described below. As illustrated in FIG. 1, the engaging part 109 has a neck shaft part 116 having a diameter-constricted shape and a disc-shaped flange 115 that is formed on top of the neck shaft part 116 and that has a diameter-increased shape.

Figure 5A:
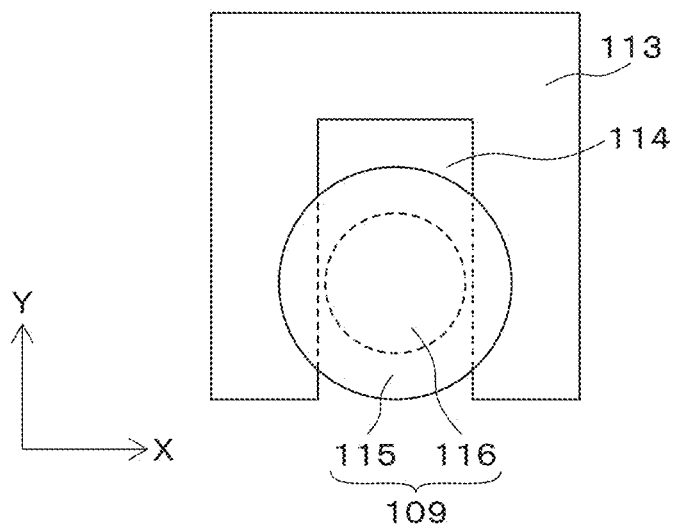
FIGS. 5A and 5B are conceptual diagrams for illustrating a principle of an engaging structure.
Figure 5B:
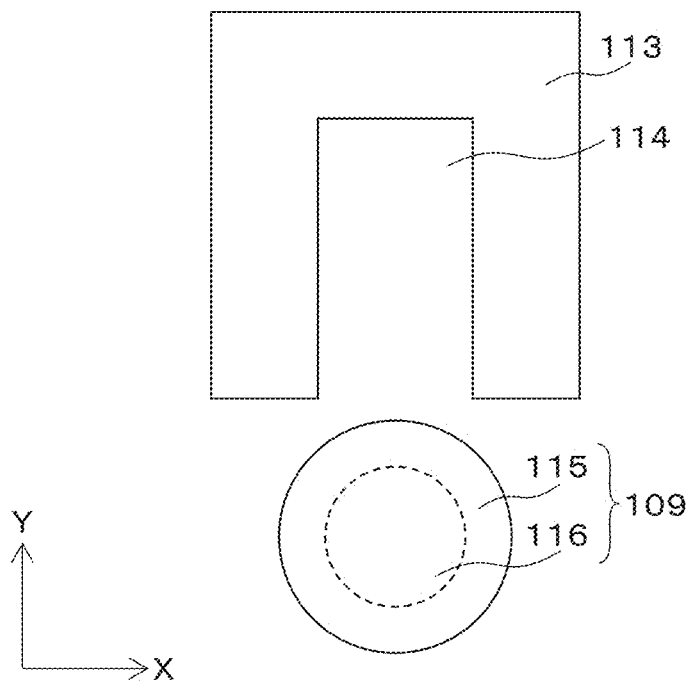

FIGS. 5A and 5B are conceptual diagrams for illustrating a principle of the engagement of the handle support 107 with the main body part 101b. An engaging member 113 that has a recessed shape as seen from the above (in a Z-axis positive direction) is arranged in the handle support 107. The engaging member 113 is structured to receive the neck shaft part 116 (refer to FIG. 1) of the engaging part 109 of the main body part 101b by an inside 114 of the recess. The engaging member 113 is urged by an urging means such as a spring, in the Y-axis negative direction. The handle support 107 is provided with a slide button 117. The engaging member 113 moves in conjunction with the slide button 117. Specifically, when the slide button 117 is slid in the Y-axis positive direction, the engaging member 113 moves in the Y-axis positive direction. This state is illustrated in FIG. 5B. When the slide button 117 is released, the biasing means makes the engaging member 113 move in the Y-axis negative direction and thereby come into the state illustrated in FIG. 5A.

First, a case of attaching the handle 105 to the main body part 101b is described. In this case, while the slide button 117 is pushed in the Y-axis positive direction, the handle support 107 is made to contact the upper part of the main body part 101b. At this time, the positional relationship between the handle support 107 and the main body part 101b is adjusted so as to be in the state as illustrated in FIG. 5B. Next, the slide button 117 is released from a hand. Thus, the biasing means makes the engaging member 113 move in the Y-axis negative direction and thereby change the state illustrated in FIG. 5B into the state illustrated in FIG. 5A. In the state illustrated in FIG. 5A, the engaging member 113 overlaps an outer edge of the disc-shaped flange 115 (refer to FIG. 1) at the upper part of the engaging part 109 and thereby comes in a condition of not being able to move in the Z-axis positive direction (that is, in the upward direction) relative to the engaging part 109. As a result, the handle 105 is attached to the main body part 101b.

In a practical operation, while the button 112 is pushed, and the slide button 117 is slid in the Y-axis positive direction at the same time, the end 108 is pushed into the handle support 102, and moreover, the handle support 107 is made contact with the upper part of the main body part 101b. Then, the button 112 and the slide button 117 are released from a hand, to obtain the state illustrated in FIGS. 4A, 4B, and 5A, that is, the condition in which the handle 105 is secured to the main body 101.

Conversely, to remove the handle 105 from the main body 101, while the button 112 is pushed, and the slide button 117 is slid in the Y-axis positive direction at the same time, the end 108 is detached from the handle support 102, and the handle support 107 is taken out from the main body part 101b at the same time. The above operation is simply performed without the use of any tool.

As described above, the surveying device 100 includes the handle 105 with the cantilever structure having the rod-like grip 106 and the handle support 107 that supports the end of the grip 106 and includes the main body 101 with the upper part structure of the double headed structure having the main body parts 101b and 101a that extend upwardly. The handle support 102 has the light receiving part 103 for optical communication and has the rod-like grip 106 that is attachably and detachably secured. The handle support 102 is secured to the upper part of the main body part 101a. The handle support 107 is attachably and detachably secured to the upper part of the main body part 101b.

The handle support 102 is attachably and detachably secured to the main body part 101a. The handle support 107 is integrated with the grip 106 (as a unitary structure so as not to be attached to or detached from the grip 106). The handle support 107 includes the slide button 117 that moves the engaging part 113 for engaging with the main body part 101b. The handle support 102 includes the button 112 that moves the engaging part 111 for engaging with the end 108 of the grip 106. Additionally, the handle supports 102 and 107 are positioned at approximately the same height, and the rod-like grip 106 is approximately horizontal, thereby providing a structure that is easy to hold by a hand.

The handle 105 is removable by an easy operation. Moreover, the light receiving part 103 is arranged at the highest possible position of the upper part. Furthermore, the handle 105 is removable while the light receiving part 103 is secured to the main body 101, and removal of the light receiving part 103 is not necessary.

For example, a configuration excluding the optical communication function may also be implemented for a low cost model. In this case, a structure excluding a unit relating to the optical communication function is adapted for the handle support 102.

Explanation of Reference Signs

The reference sign 100 denotes a surveying device, 101 denotes a main body, 101a denotes a main body part, 101b denotes a main body part, 102 denotes a handle support, 103 denotes a light receiving part, 104 denotes an antenna, 105 denotes a handle, 106 denotes a grip, 107 denotes a handle support, 108 denotes an end, 109 denotes an engaging part, 110 denotes a groove, 111 denotes an engaging member, 112 denotes a button, 113 denotes an engaging member, 114 denotes an inside of a recess, 115 denotes a flange, 116 denotes a shaft member, and 117 denotes a slide button.

What is claimed is:

1. A surveying device comprising:
a handle with a cantilever structure having a rod-like grip and a first support that supports an end of the grip; and
a main body with an upper part structure of a double headed structure having a first part and a second part that extend upwardly,
wherein a second support has a light receiving part for optical communication and has the rod-like grip that is attachably and detachably secured, the second support is secured to an upper part of the second part, the first support is attachably and detachably secured to an upper part of the first part, and the first support includes a first button that moves an engaging member engaging with the first part.

2. The surveying device according to claim 1, wherein the second support is attachably and detachably secured to the second part.

3. The surveying device according to claim 2, wherein the first support and the second support are secured at the same height position, and the rod-like grip is horizontal.

4. The surveying device according to claim 1, wherein the first support and the second support are secured at the same height position, and the rod-like grip is horizontal.

5. A surveying device comprising:
a handle with a cantilever structure having a rod-like grip and a first support that supports an end of the grip: and
a main body with an upper part structure of a double headed structure having a first part and a second part that extend upwardly,
wherein a second support has a light receiving part for optical communication and has the rod-like grip that is attachably and detachably secured, the second support is secured to an upper part of the second part, the first support is attachably and detachably secured to an upper part of the first part, wherein the second support includes a second button that moves an engaging member engaging with the rod-like grip.

6. The surveying device according to claim 5, wherein the first support and the second support are secured at the same height position, and the rod-like grip is horizontal.

* * * * *

UNITED STATES PATENT AND TRADEMARK OFFICE
CERTIFICATE OF CORRECTION

PATENT NO. : 10,816,338 B2
APPLICATION NO. : 15/779659
DATED : October 27, 2020
INVENTOR(S) : Satoshi Nakamura et al.

It is certified that error appears in the above-identified patent and that said Letters Patent is hereby corrected as shown below:

In the Specification

Column 2, Line 48, "a main body as seen from the reerse side" should read --a main body as seen from the reverse side--

In the Claims

Column 6, Claim 5, Line 41, "an end of the grip: and" should read --an end of the grip; and--

Signed and Sealed this
Ninth Day of March, 2021

Drew Hirshfeld
*Performing the Functions and Duties of the
Under Secretary of Commerce for Intellectual Property and
Director of the United States Patent and Trademark Office*